United States Patent [19]
Reber

[11] Patent Number: 4,768,333
[45] Date of Patent: Sep. 6, 1988

[54] FARM MACHINERY FOR LATERALLY MOVING AND TURNING OVER WINDROWS OF HAY

[75] Inventor: Walter Reber, Saverne, France

[73] Assignee: Kuhn, S.A., Saverne Cedex, France

[21] Appl. No.: 75,966

[22] Filed: Jul. 21, 1987

[30] Foreign Application Priority Data

Jul. 21, 1986 [FR] France ................... 86 10653

[51] Int. Cl.⁴ ............................. A01D 78/04
[52] U.S. Cl. ....................... 56/370; 56/192; 56/366; 56/376
[58] Field of Search ............... 56/192, 365, 366, 370, 56/372, 376

[56] References Cited

U.S. PATENT DOCUMENTS

| 2,629,223 | 2/1953 | Russell . | |
|---|---|---|---|
| 2,660,022 | 11/1953 | Hester | 56/366 |
| 2,727,350 | 12/1955 | Kuhlman | 56/370 |
| 2,761,270 | 9/1956 | Blaser | 56/370 |
| 2,815,636 | 12/1957 | Reilly | 56/370 |
| 3,702,052 | 11/1972 | Klassen | 56/370 |
| 4,471,605 | 9/1984 | Ender . | |

FOREIGN PATENT DOCUMENTS

| 1273181 | 11/1960 | France . |
| 1437771 | 4/1965 | France . |
| 2341258 | 9/1977 | France . |
| 2522469 | 9/1983 | France . |
| 480777 | 12/1969 | Switzerland . |
| 345919 | 4/1931 | United Kingdom . |

*Primary Examiner*—Douglas Hart
*Attorney, Agent, or Firm*—Oblon, Fisher, Spivak, McClelland & Maier

[57] ABSTRACT

This invention relates to a farm machine having a device (2) for picking up hay on the ground and a device (3) for moving the hay laterally and turning it over. The device (3) for moving and turning over the hay includes a flexible belt (21) equipped with drivers (22) and oriented crosswise to the flow of the hay. An at least approximately flat guide plate (23) extends from the pickup device (2) to the drivers (22). The machine according to the invention makes it possible to move and turn over windrows of hay or other plants that are on the ground.

30 Claims, 4 Drawing Sheets

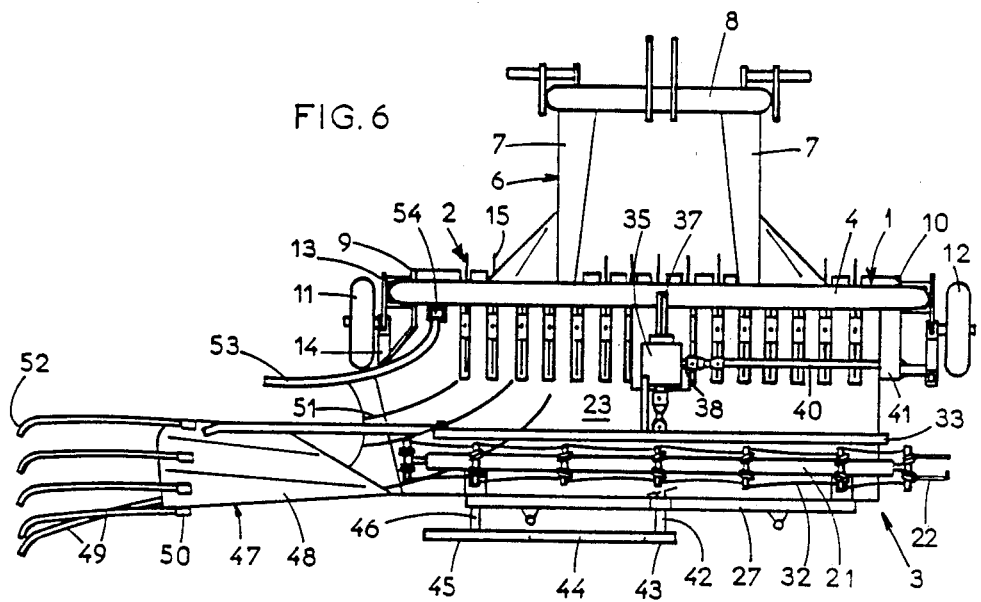
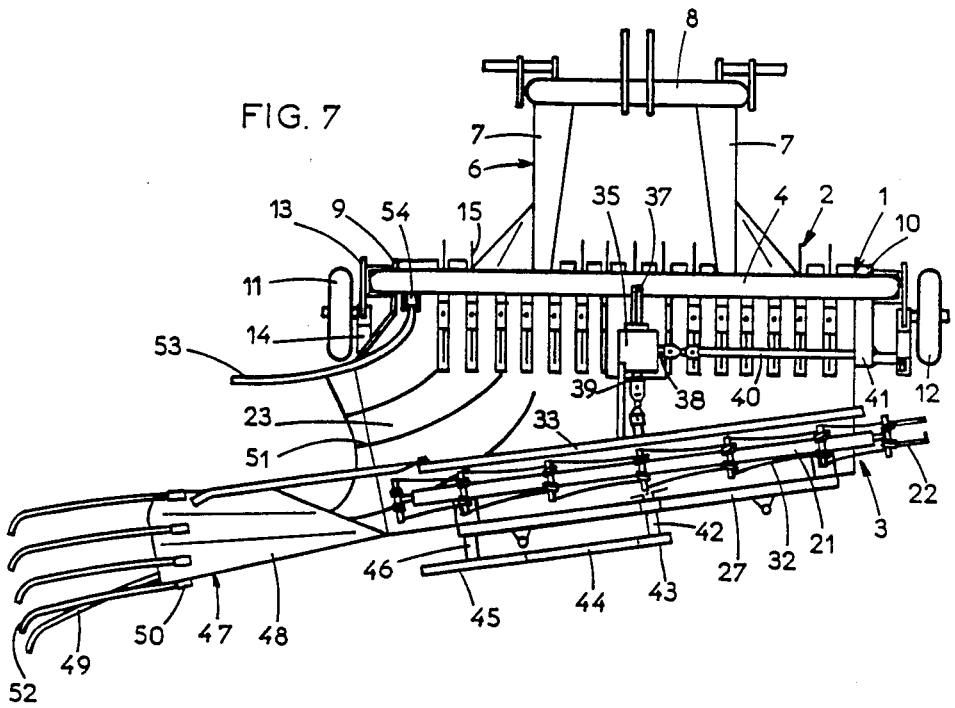

4,768,333

FARM MACHINERY FOR LATERALLY MOVING AND TURNING OVER WINDROWS OF HAY

FIELD OF THE INVENTION

This invention relates to a farm machine for laterally moving and turning over windrows of hay or other plants that are on the ground. It comprises a frame or chassis carrying a device for picking up the hay on the ground and a means for moving it laterally and turning it over. Thanks to this turning over, the hay which was close to the ground is exposed to the air and the sun to complete the drying.

BACKGROUND OF THE INVENTION

A known machine of this type comprises a pickup device extended by a large guide surface with which a drive element (disks or routing screws) cooperates. The guide surface consists of a curved plate at least partially in the shape of a helix and rising toward the back. During work, the pickup device routes the hay on the curved plate. This hay is taken up by the drive element, which is essentially oriented in the direction of the flow of the hay conveyed by the device. The drive element then moves the hay toward the back of the plate and causes it to fall back on the ground. During this movement, the curvature of the plate is supposed to cause a flipping over of the hay to obtain the desired turning over.

On this machine, the surface of the plate is larger than the action zone of the drive element. Accordingly, accumulations of hay occur in places located outside the the action zone. These accumulations quickly cause disturbances in the movement of the hay and can even cause obstructions or, indeed, total blocking of the drive element.

Additionally, the guide surface of the curved plate must be very large to assure a complete turning over of the hay. Because of this, the prior art machine is heavy, bulky, and, consequently, difficult to handle.

OBJECTS OF THE INVENTION

It is an object of the invention to provide a machine for moving and turning over hay and other windrowed plants not having the drawbacks of known machines. This machine should, in particular, assure a lateral movement and a regular turning over of the hay while being simple and easy to use.

SUMMARY OF THE INVENTION

For this purpose, an important characteristic of the invention is that the means for moving and turning over the hay consists of at least one flexible belt, strip, or similar element oriented crosswise to the flow of the hay brought by the pickup device and carrying drivers. An at least approximately flat guide plate extends from the pickup device to the drivers.

During work, the drivers move the hay coming from the pickup device laterally and cause it to fall back on the ground on one of the sides of the machine. The turning over of the hay is obtained during the falling back on the ground, particularly thanks to the lateral projection of the drivers and to the advance of the machine on the terrain. In addition, the lateral movement makes it possible to combine several windrows to facilitate their later gathering.

The crosswise arrangement of the flexible belt or strip with the drivers makes it possible to intercept all of the hay picked up immediately behind the pickup device. Thanks to this immediate taking up, the hay is moved without accumulations being able to occur between the pickup device and the drivers of the flexible belt or strip. The plate cooperates with the guiding of the hay and prevents any loss by premature falling on the ground.

Moreover, the crosswise arrangement of the flexible belt or strip with the drivers makes it possible to reduce considerably the length of the machine. The machine thus made is lighter and easier to use than the prior art machine, both during work and during transport.

It is advantageous that the flexible belt or strip extends practically over the entire width of the pickup device. This characteristic makes it possible to eliminate all zones in which the hay could accumulate and disturb the functioning of the machine.

According to another characteristic of the invention, the support chassis of the machine forms an at least approximately rectangular frame having, in particular, two crosswise beams placed at different distances from the ground. One of these beams is located above the pickup device and carries means making possible hitching to a drive tractor. Thanks to this arrangement, the center of gravity of the machine is located close to the tractor, which is advantageous particularly with machines carried by 3-point devices.

According to another characteristic of the invention, a deflector is provided, approximately, in the extension of the action zone of the drivers on the flexible belt. This deflector acts like a mouldboard to facilitate the turning over of the hay. The position of this deflector can be adjustable so that it can be adapted to the various work conditions that can be encountered. For transport, the deflector can be brought to the back of the pickup device and of the flexible belt or strip to reduce the width of the machine.

Another characteristic of the invention is that the machine comprises a guide located at the front of the flexible belt or strip and of the deflector extending in the extension of the action zone of the deflector. The guide is preferably articulated on the chassis of the machine, so as to be able to adapt to the volume of the displaced hay. The guide holds the hay in contact with the deflector so that, in practice, it starts its flipping over at the level of the guide.

According to another characteristic of the invention, a transmission housing for the driving of the pickup device and of the flexible belt or strip is placed on the crosswise beam of the chassis located above the pickup device. The housing can thus, be located approximately in the axis of the power takeoff shaft of the tractor. This makes possible a direct connection between the power takeoff shaft and the input shaft of the housing. In addition, the housing can be fastened close to the center of gravity of the machine, for a good balancing of the machine.

Other characteristics and advantages of the invention will become apparent from the description given below with reference to the accompanying drawings—which represent, by way of nonlimiting example, several embodiments according to the invention.

BRIEF DESCRIPTION OF THE DRAWINGS

FIG. 6 is a top view of the machine according to the invention.

FIG. 7 is a view similar to that of FIG. 6 of a fourth embodiment of the invention.

DETAILED DESCRIPTION OF THE PRESENTLY PREFERRED EMBODIMENTS

Figure 1:
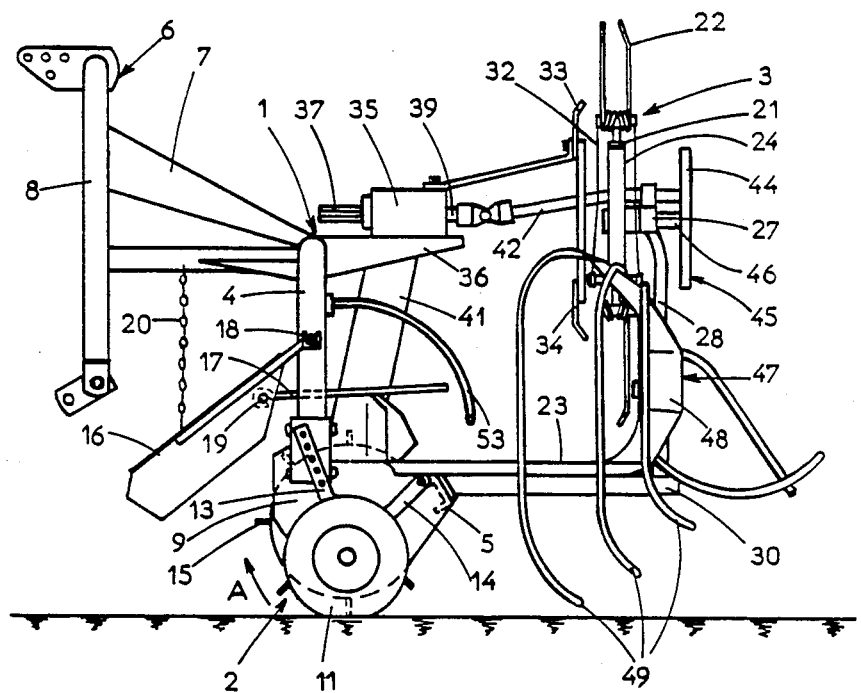
FIG. 1 is a side view of the machine according to the invention.
Figure 2:
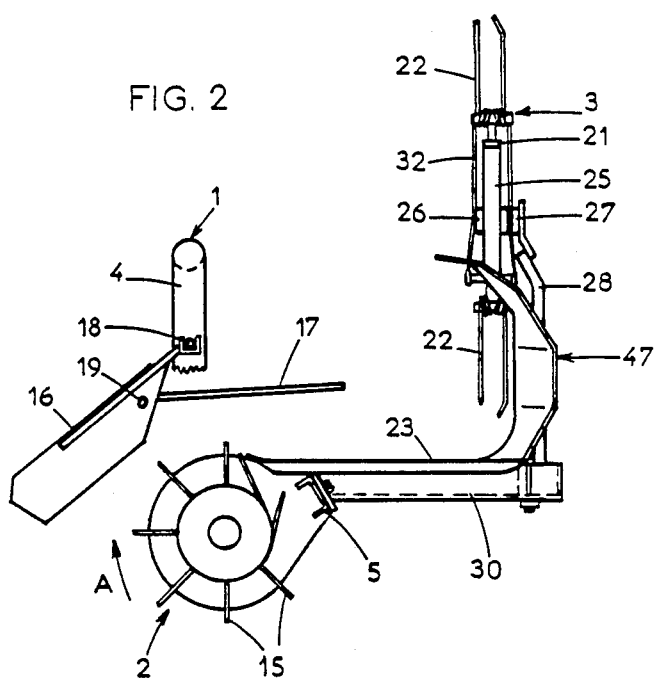
FIG. 2 is a partial section in diagrammatic form of the machine according to FIG. 1.

As it is represented in FIGS. 1 and 2, the machine according to the invention comprises a chassis carrying a pickup device 2 for picking up hay on the ground and, behind the device, a means 3 for moving the hay laterally and turning it over.

The chassis 1 forms an at least approximately rectangular frame. In particular, It is composed of two crosswise beams 4 and 5 placed at different distances from the ground and, approximately , one above the other.

The upper beam 4 is located above the pickup device 2 and carries hitching means 6. The hitching means 6 consists of two side rails 7 directed toward the front and connected to a bow member 8 provided with three fastening points. The two ends of the upper beam 4 are bent downwardly and are connected to the lower beam 5 by means of lateral pieces of sheet metal 9 and 10 (see FIG. 4). The lower beam 5 is located on the back side of the pickup device 2.

On each side of the pickup device 2, a small support wheel 11, 12 (see FIG. 4) is provided. Each small support wheel 11, 12 is held by means of two connecting rods 13, 14 articulated on the chassis 1. The connecting rod 13 can be immobilized in various positions in relation to the chassis 1. The connecting rod 13 makes it possible to regulate the position of the machine in relation to the ground. During work, the two small support wheels 11, 12 move over the ground and carry the machine.

The pickup device 2 consists of a pickup with controlled teeth 15. During work, the controlled teeth 15 are driven in rotation in the direction of the arrow A around an at least approximately horizontal axis. The controlled teeth 15 pickup the hay lying on the ground and convey the hay to the means 3. The controlled teeth 15 could be replaced with pallets of flexible material, either controlled or not controlled during rotation.

At the front of and above the pickup device 2 are placed a screen 16 and guide rod 17. The screen 16 and the guide rod 17 form a guide channel with the pickup device 2 in which the pickup device 2 moves the hay. The screen 16 is articulated on the chassis 1 by means of pins 18, while the guide rod 17 are themselves articulated on the screen 16 by means of pins 19. These connections make it possible for the screen 16 and the guide rods 17 to move in relation to the pickup device 2 as a function of the volume of the hay picked up. A retaining chain 20 limits the downward movement of the screen 16.

The means 3 for moving and turning over the hay consists of at least one flexible belt or strip 21 or a similar element, oriented crosswise to the flow of the hay brought up by the pickup device 2 and carrying drivers 22. The drivers 22 can consist of teeth or flexible blades or similar elements. In the accompanying figures, only a single flexible belt or strip 21 is represented. However, two or more flexible belts or strips 21 can be provided one behind the other. An at least approximately flat guide plate 23 extends from the pickup device 2 to the drivers 22. The drivers 22 thus move the picked up hay on the guide plate 23.

Figure 4:
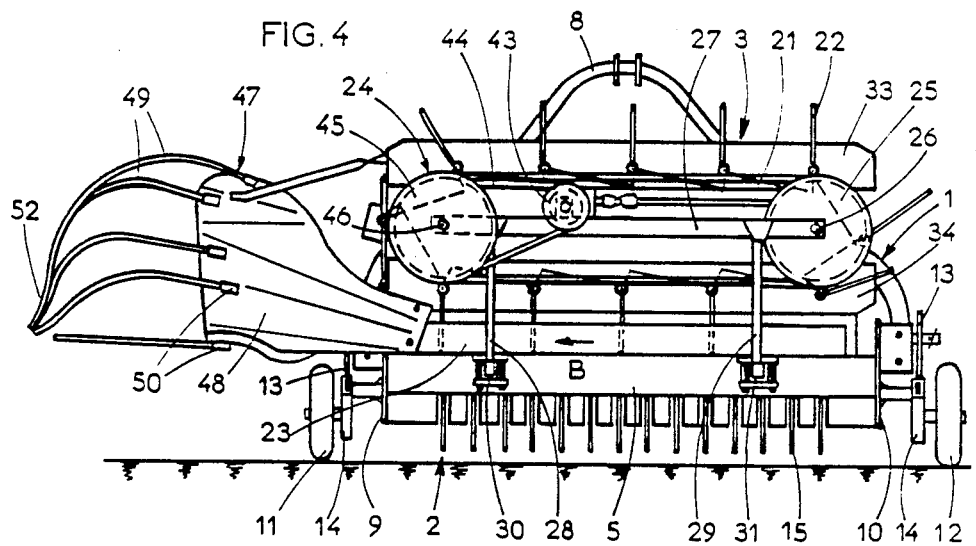
FIG. 4 is a back view of the machine according to the invention.
Figure 5:
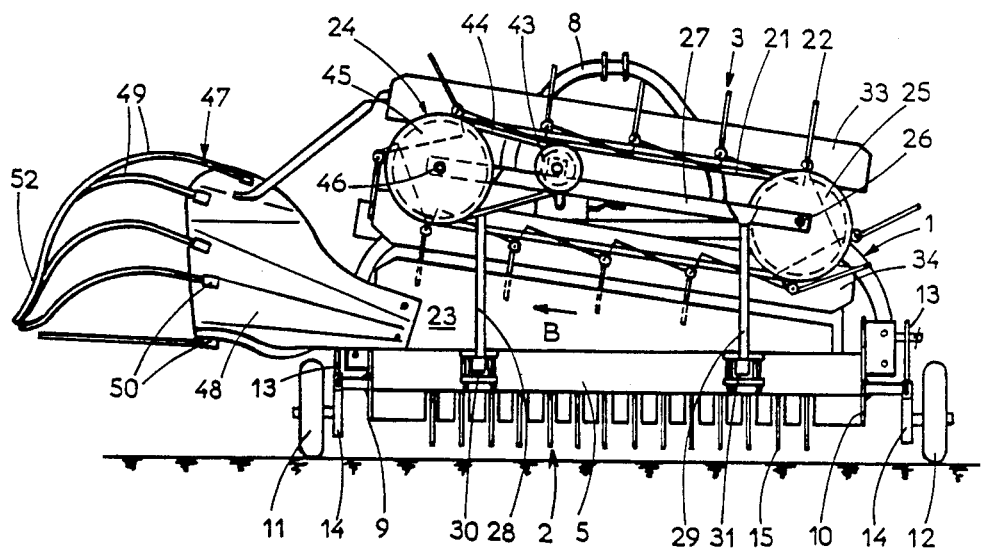
FIG. 5 is a view similar to that of FIG. 4 of a third embodiment of the invention.

As can be seen, in particular in FIGS. 4 and 5, the flexible belt or strip 21, extends approximately over the entire width of the pickup device 2. The flexible belt or strip 21 is guided on two grooved pulleys 24, 25. Each of the grooved pulleys 24, 25 is placed at least approximately at the level of one of the ends of the pickup device.

The grooved pulleys 24, 25 are mounted on shafts 26, and the shafts 26 are mounted on a crossbeam 27 placed at the back of the grooved pulleys 24, 25. The crossbeam 27 is held by means of two posts 28, 29. At its lower part, each of the posts 28, 29 is flangemounted on a side rail 30, 31 connected to the lower beam 5 of the chassis 1.

The shafts 26 of the grooved pulleys 24, 25 are inclined in relation to the vertical. The two runs of the flexible belt or strip 21 are thus located at different heights in relation to the guide plate 23. The lower run constitutes the active part of the flexible belt or strip 21. On the active part, the drivers 22 are directed downwardly, and their lower ends are located close to the guide plate 23 on which the hay slides. The lower ends of the drivers 22 thus quickly come into contact with the hay and drive it vigorously. In practice, this excludes any accumulation of hay from being able to interfere with its movement and later its drying. The drivers 22 of the examples represented are articulated on the flexible belt or strip 21 and are connected to one another by means of rods 32. Thus, the drivers 22 work with each other in such a way that, on the side of the machine, they withdraw approximately vertically from the moved hay. Thus, lateral projections that are too great are avoided.

Figure 3:
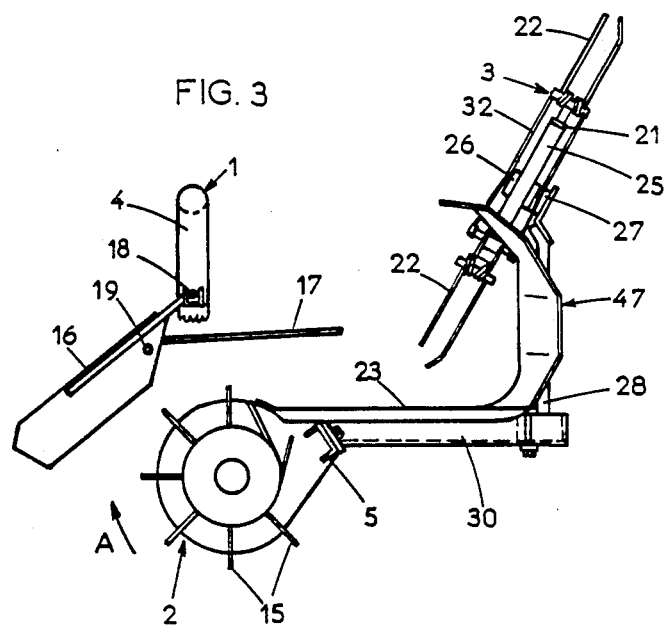
FIG. 3 is a section similar to that of FIG. 2 of a second embodiment of the invention.

In FIG. 2, the shafts 22 of the grooved pulleys 24, 25 form angles of about 90° with the vertical, and the drivers 22 are at least approximately perpendicular to the guide plate 23. In this position, the drivers 22 have a good hold on the hay and can easily move large quantities. For the movement of heavy hay, for example when the hay is green, it can be advantageous to choose the embodiment shown in FIG. 3. In this Figure, the shafts 26 are inclined so that, on the active part of the flexible belt or strip 21, the drivers 22 are directed toward the pickup device 2. This arrangement facilitates the introduction of the drivers 22 into the hay mass to be moved. More or less inclined positions can optionally be chosen by the user. To do this, the position of the post 28, 29 in relation to the side rails 30, 31 can be adjustable.

On the other hand, it will be seen in the embodiment of FIG. 4 that the active part of the flexible belt or strip 21 is at least approximately horizontal. In this case, the hay is simply moved horizontally.

In the embodiment shown in FIG. 5, the active part of the flexible belt or strip 21 is inclined in relation to the horizontal. The active part of the flexible belt or strip 21 is higher on the side toward which the hay is moved. This inclination is attained by the use of post 28, 29 of different lengths. Because of this arrangement, the drivers 22 lift the hay at the same time as they move it laterally. This facilitates the turning over of the hay while it is falling back on the ground. The guide plate 23 can also have a part which is raised in the same way as the active part of the flexible belt or strip 21. The inclination of the active part in relation to the horizontal can also be adjustable so that the user can adapt the machine to the hay to be moved and turned over. To do this, at least the post 28 located on the side toward which the hay is moved can be made in two or more parts that can move in relation to each other.

From the top view shown in FIG. 6, it can be seen that the active part of the flexible belt or strip 21 is at least approximately parallel to the pickup device 2. This position is perfectly suited to the movement of small or medium quantities of hay. In case there are large volumes of hay to be moved, the arrangement according to FIG. 7 is most appropriate. In this embodiment, the active part of the flexible belt or strip 21 is inclined in relation to the pickup device 2. The end of the flexible belt or strip 21 farther away from the pickup device 2 is located on the side toward which the hay is moved. In this case, the space between the pickup device 2 and the drivers 22 is widened so that very large hay masses can be easily made to go through.

The distance or the inclination of the active part of the flexible belt or strip 21 in relation to the pickup device 2 can be adjustable. This characteristic makes it possible for the user to choose the position which suits as a function of the volume of the hay to be moved and/or turned over. This adjustment can be obtained by moving the posts 28, 29 or only one of the posts 28, 29 on the side rails 30, 31.

At the front of the two runs of the flexible belt or strip 21 are advantageously provided slides 33, 34 (see FIGS. 1, 4, and 5). The slides 33, 34 extend over practically the entire width of the machine and prevent any hay from hooking on the runs. The backside of the guide plate 23 is raised and extends vertically behind the drivers 22. The raised part of the guide plate 23 forms a screen preventing any loss of hay on the back side of the machine.

During work, the pickup device 2 and the flexible belt or strip 21 are driven from the power takeoff shaft of a tractor (not shown). For this purpose, a transmission housing 35 is provided on a support 36 mounted on the upper beam 4 of the chassis 1 (see FIG. 1). The housing 35 is thus located above the pickup device 2 and approximately at equal distance from the two ends of the pickup device 2. The housing 35 has an input shaft 37 intended to be connected to the power takeoff shaft of the tractor and two output shafts 38, 39. The output shaft 38 (see FIGS. 6 and 7) extends laterally and drives, by means of an intermediate shaft 40, a chain or belt housed in a lateral casing 41. The chain or belt goes over a toothed wheel which is connected to the pickup device 2 and provides its drive in the direction of the arrow A. The output shaft 39 of the transmission housing 35 extends toward the back and is connected by an intermediate shaft 42 passing between the two runs of the flexible belt or strip 21 to a pulley 43 located on the back side of the machine. Over the pulley 43 passes a belt 44 which passes over a receiving pulley 45 mounted on a shaft 46. The shaft 46 drives the pulley 24 carrying the flexible belt or strip 21. This arrangement makes it possible to drive the flexible belt or strip 21 in the direction of the arrow B so that the drivers 22 move the hay as previously described. In certain cases, for example, for the combining of windrows, it is advantageous to be able to move the hay toward one of the sides of the machine during a first pass, and toward the opposite side during the following pass. To do this, a reverser of the direction of rotation of the various pulleys in transmission housing 35 can be provided.

To facilitate the 180° turning over of the hay moved, the machine can be equipped with a deflector 47 located in the extension of the action zone of the drivers 22 of the flexible belt or strip 21. In FIGS. 1 and 4 to 7, it is seen that the deflector 47 extends laterally on the side toward which the hay is moved. The deflector 47 is connected to the guide plate 23 and partially extends the latter.

The deflector 47 is curved in the shape of a mouldboard so that it communicates a movement of rotation to the moved hay. To do this, the deflector 47 has an approximately horizontal part followed by an arc-shaped part. In the example shown, the deflector 47 consists of a plate 48 and rods 49. The rods 49 are introduced in tubes 50 fastened to the plate 48. The position of the rods 49 is adjustable, and the rods 49 can be easily disassembled to reduce the width of the machine during transport. The makeup of the deflector 47 can obviously be different from the one described above without its action on the hay being modified. The plate 48 and the guide plate 23 advantageously have ribs 51 directed upwardly. The ribs 51 reduce the friction surface, which facilitates the sliding of the hay.

The deflector 47 is fastened to the machine in an adjustable way and in a way that can be easily disassembled—for example, by means of bolts provided with butterfly nuts. This method of fastening makes it possible for the user to quickly disassemble the deflector 47 to reduce the width of the machine for transport. The deflector 47 can also be articulated on the machine, thereby being able to be folded backwardly or upwardly around a hinge pin.

Moreover, the outside part of the deflector 47 constitutes a screen 52 which limits the lateral projection of the hay. An independent screen, directly attached to the machine, could also be used.

As can be seen in FIGS. 1, 6 and 7, the machine has a guide 53 that pushes the moved hay toward the deflector 47. The guide 53 is located above the guide plate 23 and to the front of the deflector 47. The guide 53 consists of a rod oriented in the direction of movement of the hay. The rod is articulated on the upper beam 4 of the chassis 1 by means of a pin 54. Thanks to this articulation, the guide 53 can be moved in relation to the guide plate 23 and to the deflector 47. This characteristic makes it possible for the guide 53 to adapt continuously to the thickness of the hay mass moved.

The machine according to the invention can be hitched directly to a tractor and be driven by the tractor as previously described. It can also be combined with another hay processing apparatus such as a mower or mower-conditioner. In this case, the machine makes it possible to move immediately the mown products for the purpose of combining them to facilitate their later pickup. In this combination, it can be driven either from the other hay processing apparatus or by specific means such as a hydraulic motor.

It is quite obvious that various improvements, modifications, or additions can further be made to the examples described above and that certain equivalent elements can be replaced without thereby going outside the scope of this invention.

WHAT IS CLAIMED AS NEW AND DESIRED TO BE SECURED BY LETTERS PATENT OF THE UNITED STATES IS:

1. A farm machine for laterally moving and turning over of hay windrows, said farm machine comprising:
   (a) a chassis;
   (b) a pickup device for picking up hay on the ground mounted on said chassis; and
   (c) first means for laterally moving and turning over the hay picked up by said pickup device, said first means comprising:
      (i) at least one flexible belt or strip oriented crosswise to the flow of hay brought to said first means by said pickup device;
      (ii) a plurality of drivers mounted on said at least one flexible belt or strip;
      (iii) an at least approximately flat guide plate sized, shaped, and positioned to receive hay from said pickup device and to support the hay while it is moved laterally by said plurality of drivers; and
      (iv) second means for turning over the hay moved laterally by said plurality of drivers.

2. A farm machine according to claim 1 wherein said chassis forms an at least approximately rectangular frame comprising two crosswise beams placed at different distances from the ground.

3. A farm machine according to claim 2 wherein one of said two crosswise beams is located above said pickup device and carries hitching means.

4. A farm machine according to claim 1 wherein said at least one flexible belt or strip extends over the entire width of said pickup device and is guided on at least two pulleys, each of said at least two pulleys being placed at the level of one of the ends of said pickup device.

5. A farm machine according to claim 4 wherein:
   (a) each one of said at least two pulleys is mounted on a shaft and
   (b) the shafts of said at least two pulleys are inclined in relation to the vertical.

6. A farm machine according to claim 4 wherein, on the active part of said at least one flexible belt or strip, said plurality of drivers are directed downwardly, their lower ends being located in the vicinity of said guide plate.

7. A farm machine according to claim 6 wherein, on the active part of said at least one flexible belt or pulley, said plurality of drivers are at least approximately perpendicular to said guide plate.

8. A farm machine according to claim 1 wherein the active part of said at least one flexible belt or pulley is at least approximately horizontal.

9. A farm machine according to claim 1 wherein the active part of said at least one flexible belt or strip is inclined in relation to the horizontal.

10. A farm machine according to claim 1 wherein the position of the active part of said at least one flexible belt or strip in relation to the horizontal is adjustable.

11. A farm machine according to claim 1 wherein, seen from above, the active part of said at least one flexible belt or strip is at least approximately parallel to said pickup device.

12. A farm machine according to claim 1 wherein, seen from above, the active part of said at least one flexible belt or strip is inclined in relation to said pickup device, the end farther away from said pickup device being the one located on the side toward which the hay is moved.

13. A farm machine according to claim 1 wherein the distance of the active part of said at least one flexible belt or strip in relation to said pickup device is adjustable.

14. A farm machine according to claim 1 wherein the inclination of the active part of said at least one flexible belt or strip in relation to said pickup device is adjustable.

15. A farm machine according to claim 1 wherein said plurality of drivers are teeth or flexible blades.

16. A farm machine according to claim 15 wherein said plurality of drivers are controlled so that they withdraw at least approximately vertically from the moved hay.

17. A farm machine according to claim 1 wherein said second means comprises a deflector provided in the extension of the action zone of said plurality of drivers, said deflector extending laterally in the extension of said guide plate on the side toward which the hay is moved.

18. A farm machine according to claim 17 wherein said deflector is curved in the shape of a mouldboard.

19. A farm machine according to claim 17 wherein said deflector comprises a plate and a plurality of rods.

20. A farm machine according to claim 19 wherein said plate has ribs to facilitate the sliding of the hay.

21. A farm machine according to claim 17 wherein said deflector can be easily disassembled from the rest of the farm machine.

22. A farm machine according to claim 17 wherein said deflector can be pivoted with respect to the remainder of said first means.

23. A farm machine according to claim 1 and further comprising a guide located above said guide plate and to the front of said second means.

24. A farm machine according to claim 23 wherein said guide comprises a rod oriented in the direction of movement of the hay.

25. A farm machine according to claim 23 wherein said guide can be moved in relation to said guide plate.

26. A farm machine according to claim 23 wherein said guide can be moved in relation to said second means.

27. A farm machine according to claim 1 wherein guide means for the hay are placed above said pickup device.

28. A farm machine according to claim 1 wherein said second means comprise a screen for limiting lateral projection.

29. A farm machine according to claim 1 and further comprising a transmission housing from which said pickup device and said at least one flexible belt or strip are driven, said transmission housing being mounted on said chassis.

30. A farm machine according to claim 29 wherein said transmission housing has a first output shaft which drives said pickup device and a second output shaft which drives said at least one flexible belt or strip.

* * * * *